Oct. 17, 1961 W. O. LYTLE 3,004,875
COATING GLASS SHEETS
Filed Nov. 22, 1957

INVENTOR.
WILLIAM O. LYTLE
BY Oscar H. Spencer
ATTORNEY

United States Patent Office 3,004,875
Patented Oct. 17, 1961

3,004,875
COATING GLASS SHEETS
William O. Lytle, New Kensington, Pa., assignor to Pittsburgh Plate Glass Company, Allegheny County, Pa., a corporation of Pennsylvania
Filed Nov. 22, 1957, Ser. No. 698,173
8 Claims. (Cl. 117—211)

The present application relates to coating glass sheets and particularly refers to a novel method for providing a metal oxide coating of non-uniform thickness on glass or other refractory sheets by applying a uniform spray of a composition capable of producing a metal oxide film upon contacting a sheet of glass or other refractory material heated to film forming temperature.

The prior art, as exemplified by U.S. Patent 2,569,773 to Leighton E. Orr, teaches production of films of non-uniform thickness on bases moved longitudinally through a spraying station by employing sprays of non-uniform density. The article patented by Orr is produced by providing relative movement between a heated base and a spray of non-uniform density so that the paths of relative movement of portions of a base to be thickly coated are aligned with the relatively dense regions of the spray and the portions of the base to be thinly coated are aligned with relatively sparse regions of the spray. The production of such films involves close tolerance of the settings of orifices of spray guns employed to produce such graded coatings and precise control of alignment of the sparse and dense spray regions with the different portions of the sheet to be coated.

Another technique for producing coatings is disclosed in U.S. Patent 2,061,107 to Newton L. Schellenger. This patent provides resistor material of non-uniform density on a moving tape by spraying a uniform spray at an oblique angle transversely of the axis of movement of the tape in order to provide a coating that is relatively thick along an edge of the tape closest to the point of origin of the spray and gradually decreasing in thickness with increasing distance from the point of origin of the spray. Therefore, the prior art has always considered it proper technique to orient an article so that its edge to be provided with maximum thickness of coating is most closely adjacent to the origin of the spray to be applied obliquely transversely of the path of movement.

The techniques disclosed by Schellenger could not be employed in the commercial production of glass sheets provided with a band of coating material gradually tapering in thickness from a maximum along an edge to an uncoated portion beginning approximately 9 inches laterally inboard of the edge, because a proper line of demarcation between the coated and uncoated regions was very difficult to maintain. Therefore, it was necessary to coat a larger area than ultimately desired for coating and remove the portion of the coating that extended into the region desired to be maintained free of coating.

The requirements for close tolerances of the spray gun manipulation required for the Orr technique and the relatively high cost necessitated by the Schellenger technique involving first coating and then decoating a portion of the area of a refractory sheet to be partially coated has motivated the development of a more readily reproducible, low cost technique for producing graded bands of coating along an edge of refractory sheets.

According to the present invention, it has been found that by applying to a heated sheet supported in a fixed plane a spray of uniform density from an origin in a plane spaced from said fixed plane about a fixed central axis oriented at an oblique angle between on the order of 15° and on the order of 45° relative to and transversely of said fixed plane and providing relative movement between the sheet and the axis about which the spray is applied at a uniform velocity along a longitudinal axis lying in one of said planes, that a metal oxide film is formed having non-uniform thickness transversely of the axis of relative movement. The thickness varies from a minimum along a line inboard of an edge of said sheet intersecting an edge of said spray the shortest possible distance between the sprayed portion of the sheet and the point of origin of the spray and increasing within the sprayed portion of said sheet with increasing distance from the point of origin of the spray. This totally unexpected result makes possible the coating of glass sheets in the form of a band having a thickness that increases gradually to a maximum along an edge of the sheet without requiring any subsequent removal of coating from areas desired to be maintained in an uncoated condition. Furthermore, this non-uniform coating can be made by a spray of substantially uniform density which is easier to control than non-uniform sprays.

The present invention will be understood more thoroughly after studying a description of a particular embodiment of the present invention which follows. The description includes drawings which are not necessarily to scale as they are intended to facilitate illustration of the present invention.

In the drawings, wherein like reference characters refer to like structural elements, FIGURE 1 is a schematic longitudinal sectional view of a typical apparatus for performing the present invention;

Figure 1:
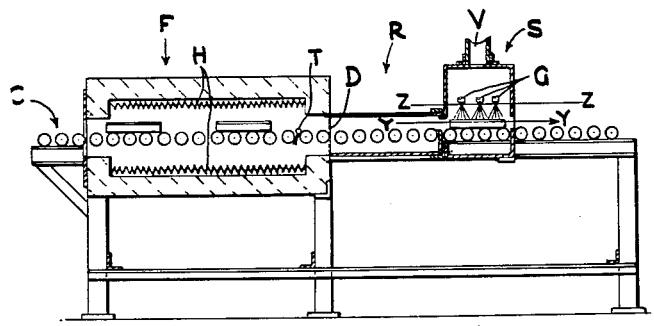

The apparatus includes a furnace F in the form of a tunnel through which a stub roll conveyor C extends in a horizontal plane. Heating elements H are located above and below the stub roll conveyor C. Near the exit end of the furnace F is a trip switch T. This trip switch actuates a vertically movable door D at the furnace exit and a high speed run-out conveyor R.

The run-out conveyor R extends into a spray booth S provided with spray guns G and a vacuum exhaust stack V. The spray guns G are supported on bracket supports (not shown) above the run-out conveyor R. Each spray gun G is provided with an orifice O which serves as an origin of a spray filming composition. A cover shield CS is located below the spray guns G and above run-out conveyor R in order to prevent drippings of coating composition from falling onto a portion of a sheet that is desired to be kept free from coating material.

The flat glass sheet 10 is mounted on a skeleton support 12 comprising a peripheral rail 14 having a horizontally disposed upper support surface 15 that conforms to the outline of the glass sheet to be conveyed on the skeleton support 12. Braces 16 reinforce the peripheral rail 14 by interconnecting opposite portions thereof. The skeleton support 12 rides longitudinally along stub rolls 18 for conveyor C and the run-out portion R.

Figure 2:
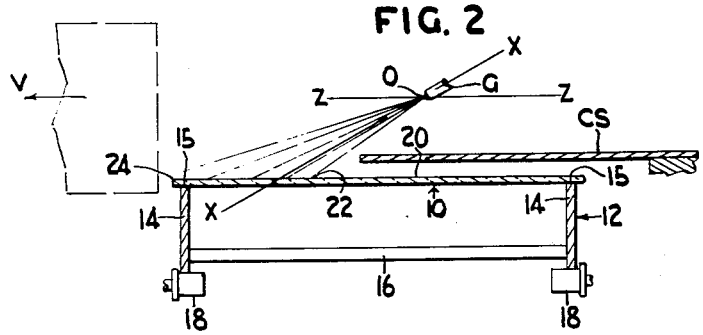
FIGURE 2 is a fragmentary sectional view taken approximately along the lines II—II of FIGURE 1.
Figure 3:
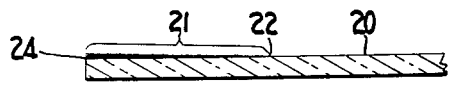
FIGURE 3 is a fragmentary sectional view of a flat glass sheet taken along the lines III—III of FIGURE 4, showing the formation of a coating after the application of a coating composition thereto in the manner depicted in FIGURE 2.
Figure 4:
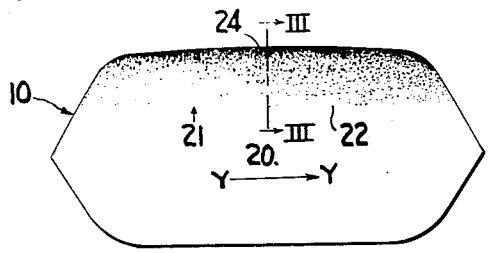
FIGURE 4 is a plan view of a coated sheet produced by the method described herein.

The glass sheet includes a portion 20 that is to be uncoated and a portion 21 to be coated in the form of a graded band having a thinly coated boundary 22 adjacent the uncoated portion 20 and gradually increasing in thickness toward an edge 24. As seen in FIGURE 2, as the glass sheets 10 are conveyed along an axis Y—Y, portion 20 passes substantially completely beneath cover sheet CS and the spray guns G are disposed with their orifices O disposed in a plane Z—Z spaced from the fixed plane of support for the glass sheets 10 provided by the conveyor C and its run-out extension R. Each spray gun G is adjusted to provide a spray of uniform density originating at its orifice O and disposed about a fixed central axis X—X oriented transversely of the axis of movement Y—Y at an oblique angle to the fixed plane of support for the sheet. The oblique angle should not exceed on the order of 45° because of the danger of back splatter forming spots on area 20 of the sheet. Also, oblique angles less than on the order of 15° make it difficult to control the exact location of the cut-off line 22 between the coated and uncoated regions 21 and 20, respectively.

The spray emanating from each spray gun G extends conically from its origin at orifice O along the axis X—X. The spray guns are so disposed relative to the path of movement of the sheets to be coated with a graded band that the minimum straight line distance between the spray origin represented by the orifice O and the portion of the sheet intersected by the spray exists at the line of demarcation between the uncoated area 20 and the coated area 21. This distance increases gradually transversely of the axis of relative movement Y—Y reaching a maximum at the edge 24. The prior art would expect a maximum coating thickness at the line of minimum distance or at the interface. On the contrary, the coating thickness of a film so formed tapers from a maximum along edge 24 to a minimum at the line of demarcation.

While the reason for forming a tapered thickness coating from a spray of uniform density is not clearly understood, it has been theorized that the reason for the gradual increase in thickness as the distance from the orifice O increases results from the fact that the hydrolizable filming composition reacts chemically at the heated glass surface to form a metal oxide. Since the spray strikes the heated glass surface at an acute angle, a portion of the spray bounces off the surface or rolls toward the edge 24 and fails to react with the glass at the point of initial impact. The bounced or rolled portion of the unreacted spray composition is free to react with a portion of the surface closer to edge 24. As each increment across the band 21 to be coated is directly exposed to the same amount of spray composition, but the amount of unreacted composition moving toward the edge 24 increases with each transverse increment of band 21 toward edge 24, the amount of film formed on each increment of the band 21 increases toward the edge 24. Hence, the film formed is thickest at the maximum distance of sheet to spray origin or along the edge 24. Unreacted spray composition that reaches the edge 24 of the sheet is evacuated through the vacuum stack V.

*Example I*

Glass sheets, having a nominal thickness of ¼ inch, 72 inches long, and 30 inches wide, were precut to outline and mounted on skeleton support structures having horizontally disposed upper surfaces conforming to the outline of the precut glass sheet. The supported sheets were conveyed longitudinally along an axis Y—Y through a heating furnace F maintained at 1100° F. The sheets remained in the furnace for 7 minutes during their passage, and then were moved rapidly to spray booth S.

The spray guns G were caused to operate 1 to 2 seconds before the leading edge of each glass sheet reached the spray. Three spray guns whose orifices were located about 2½ inches above the fixed support plane of the flat sheets were utilized in the spray section. The guns were oriented so that the fixed central axis X—X of each individual spray was oriented at an angle of 20° and so located to strike the glass sheet at 6 inches from its far edge. The glass sheets were translated past the spray guns at a speed of 10 inches per second and about 100 cc. of spraying composition applied to the entire sheet through the three spray guns.

A coating of graded thickness with the thickness tapering from a minimum at its inboard extremity 22 about 9 inches laterally inboard of the edge 24 and gradually increasing in thickness toward the far edge was formed. The coating formed consisted mainly of cobalt oxide.

The film sprayed was a composition formed by boiling for 4 to 5 minutes a composition consisting essentially of 30 grams of hydrated cobalt acetate, 3 grams of nickel acetate, 100 grams of ethanol and 6 grams of glacial acetic acid, and draining the resulting composition through a 200 mesh filter.

The composition of the glass sheets consisted essentially of the following parts by weight:

| | Percent |
|---|---|
| $SiO_2$ | 71.47 |
| $Na_2O$ (including about 0.5% $K_2O$ impurities) | 13.11 |
| CaO | 11.67 |
| MgO | 2.40 |
| $Na_2SO_4$ | .48 |
| NaCl | .12 |
| $Al_2O_3$ | .19 |
| $Fe_2O_3$ | .56 |

While the above example teaches a particular method of producing a graded band of cobalt oxide film, it is well known that various metal oxide films such as the oxides of zinc, cadmium, aluminum, indium, thallium, silicon, titanium, germanium, zirconium, tin, lead, thorium, columbium, antimony, tantalum, copper, vanadium, bismuth, chromium, molybdenum, tungsten, manganese, iron, nickel, and of various mixtures of these metals too numerous to mention may also be produced by utilizing any hydrolizable compound of the above recited metals or mixtures thereof which are or can be in fluid form, that is the vapor or an atomized solution of the compound.

Inorganic compounds which are suitable are for the most part salts of inorganic acids and include, for example, the chlorides, which are generally most suitable, as well as iodides, bromides, fluorides, sulfates, nitrates, and the like. Furthermore, organic salts and compounds of the recited metals which are available and which can be dissolved or diluted if not with water than with an organic solvent, such as alcohol, toluene, benzene or other miscible liquid, are also suitable. Such compounds may include open chain compounds such as acetates, lactates, oleates, oxalates, salicylates, stearates, tartrates, and the like, and aromatic compounds such as the benzoates, phenolates, phenolsulfonates, and so forth.

While the particular embodiment described above relates to a method of producing a metal oxide film on a glass sheet, it is understood that any refractory base other than the soda-lime silica glass mentioned above, such as mica, china, borosilicate glass, phosphate glass, silicon carbide, tungsten carbide, porcelain, stone, and so forth, which melts at temperatures above 1150° F. to 1350° F., may be provided with metal oxide films in accordance with this invention.

It is possible by means of the teaching of the present invention to employ a spray of uniform density in any plane normal to the fixed central axis about which the spray is to be applied to produce a graded coating in the form of a band merely by orienting the direction of the central axis obliquely transversely of the path of relative movement between a heated oriented sheet and the spray. However, the unusual result flowing from such teaching may be exaggerated by employing sprays of nonuniform density as desired.

The present application is a continuation-in-part of application Serial No. 606,341, filed August 27, 1956, entitled "Article of Manufacture and its Method of Fabrication."

A particular embodiment of the present invention has been described for purposes of illustration rather than

What is claimed is:

1. In a method of providing a refractory sheet with a non-uniform metal oxide film by applying to the sheet heated to a temperature above 400° F. and below the softening temperature of the sheet a spray of a film forming composition capable of producing a metal oxide film thereon, the improvement which comprises orienting said sheet in a fixed plane, applying said spray about a fixed central axis thereof to a portion only of said sheet from a point of origin of said spray located in a plane spaced from the plane of said sheet, orienting the direction of said central axis of the spray in a fixed angular relation between on the order of 15° and on the order of 45° to the plane of said sheet, and providing relative translational motion between the heated oriented sheet and the spray at the point of origin thereof at a uniform velocity along a longitudinal axis lying in one of said planes, the central axis of the spray being obliquely disposed transversely of the axis of relative movement so that a film of non-uniform thickness transversely of the axis of relative movement is formed on the refractory sheet, said thickness varying from a minimum along a line intersected by an edge of said spray traversing the shortest possible straight line distance from the point of origin of the spray to the portion and increasing transversely of said longitudinal axis to a maximum along an edge of the sheet included in said portion directly exposed to said spray.

2. The improvement according to claim 1, wherein the spray is of uniform density in any plane normal to the central axis of the spray between the point of origin of the spray and the sheet.

3. In a method of providing a glass sheet with a non-uniform metal oxide film by applying to the sheet while heated to a temperature above 400° F. and below the softening temperature of the sheet a film forming composition capable of producing a metal oxide film thereon, the improvement which comprises orienting said sheet in a fixed plane, and applying to a portion only of said sheet a uniform, substantially conical spray along a conical axis oriented in a fixed acute angular relation between on the order of 15° and on the order of 45° to the plane of said sheet, and providing relative translational motion between the heated oriented sheet and the conical axis of the spray at a uniform velocity in the fixed plane of said sheet, the central axis of the spray being obliquely disposed transversely of the axis of relative movement so that a film of non-uniform thickness transversely of the axis of relative movement is formed on the glass sheet, said thickness varying from a minimum along a line intersected by an edge of said substantially conical spray traversing the shortest possible straight line distance between the apex of the conically shaped spray and said portion, and increasing transversely of said axis of relative movement to a maximum along an edge of said sheet included in said portion directly exposed to said substantially conical spray.

4. The improvement according to claim 3, wherein the sheets are moved in a horizontal path through the spray at a constant linear velocity.

5. In a method of providing a refractory sheet with a non-uniform metal oxide film by applying to the sheet heated to a temperature above 400° F. and below the softening temperature of the sheet a spray of a film forming composition capable of producing a metal oxide film thereon, the improvement which comprises orienting said sheet in a substantially horizontal plane, applying said spray about a fixed central axis thereof to a portion only of said sheet from a point of origin of said spray located in a plane spaced from the plane of said sheet, orienting the direction of said central axis of the spray in a fixed angular relation between on the order of 15° and on the order of 45° to the plane of said sheet, and providing relative translational motion between the heated oriented sheet and the spray at the point of origin thereof at a uniform velocity along a longitudinal axis lying in one of said planes, the central axis of the spray being obliquely disposed transversely of the axis of relative movement so that a film of non-uniform thickness transversely of the axis of relative movement is formed on the refractory sheet, said thickness varying from a minimum along a line intersected by an edge of said spray traversing the shortest possible straight line distance from the point of origin of the spray to the portion and increasing transversely of said longitudinal axis to a maximum along an edge of the sheet included in said portion directly exposed to said spray.

6. In a method of providing a glass sheet with a non-uniform metal oxide film by applying to the sheet heated to a temperature above 400° F. and below the softening temperature of the sheet a spray of a film forming composition capable of producing a metal oxide film thereon, the improvement which comprises orienting said sheet in a substantially horizontal plane, applying said spray about a fixed central axis thereof to a portion only of said sheet from a point of origin of said spray located in a plane spaced from the plane of said sheet, orienting the direction of said central axis of the spray in a fixed angular relation between on the order of 15° and on the order of 45° to the plane of said sheet, and providing relative translational motion between the heated oriented sheet and the spray at the point of origin thereof at a uniform velocity along a longitudinal axis lying in one of said planes, the central axis of the spray being obliquely disposed transversely of the axis of relative movement so that a film of non-uniform thickness transversely of the axis of relative movement is formed on the glass sheet, said thickness varying from a minimum along a line intersected by an edge of said spray traversing the shortest possible straight line distance from the point of origin of the spray to the portion and increasing transversely of said longitudinal axis to a maximum along an edge of the sheet included in said portion directly exposed to said spray.

7. In a method of providing a refractory sheet with a non-uniform metal oxide film by applying to the sheet heated to a temperature above 400° F. and below the softening temperature of the sheet a spray of a film forming composition capable of producing a metal oxide film thereon, the improvement which comprises orienting said sheet in a substantially horizontal plane, applying said spray about a fixed central axis thereof to a portion only of said sheet from a point of origin of said spray located in a plane spaced from the plane of said sheet, orienting the direction of said central axis of the spray in a fixed angular relation between on the order of 15° and on the order of 45° to the plane of said sheet, and providing relative translational motion between the heated oriented sheet and the spray at the point of origin thereof along a longitudinal axis lying in one of said planes, the central axis of the spray being obliquely disposed transversely of the axis of relative movement so that a film of non-uniform thickness transversely of the axis of relative movement is formed on the refractory sheet, said thickness varying from a minimum along a line intersected by an edge of said spray traversing the shortest possible straight line distance from the point of origin of the spray to the portion and increasing transversely of said longitudinal axis to a maximum along an edge of the sheet included in said portion directly exposed to said spray.

8. In a method of providing a glass sheet with a non-uniform metal oxide film by applying to the sheet heated to a temperature above 400° F. and below the softening temperature of the sheet a spray of a film forming composition capable of producing a metal oxide film thereon, the improvement which comprises orienting said sheet in a substantially horizontal plane, applying said spray about a fixed central axis thereof to a portion only of said sheet from a point of origin of said spray located in a plane spaced from the plane of said sheet, orienting the direction of said central axis of the spray in a fixed angular relation between on the order of 15° and on the order of 45° to the plane of said sheet, and providing relative translational motion between the heated oriented sheet and the spray at the point of origin thereof along a longitudinal axis lying in one of said planes, the central axis of the spray being obliquely disposed transversely of the axis of relative movement so that a film of non-uniform thickness transversely of the axis of relative movement is formed on the glass sheet, said thickness varying from a minimum along a line intersected by an edge of said spray traversing the shortest possible straight line distance from the point of origin of the spray to the portion and increasing transversely of said longitudinal axis to a maximum along an edge of the sheet included in said portion directly exposed to said spray.

References Cited in the file of this patent

UNITED STATES PATENTS

| | | |
|---|---|---|
| 2,689,803 | Ackerman | Sept. 21, 1954 |
| 2,724,658 | Lytle | Nov. 22, 1955 |
| 2,877,329 | Gaiser | Mar. 10, 1959 |